(12) United States Patent
Wen

(10) Patent No.: US 7,729,604 B2  
(45) Date of Patent: Jun. 1, 2010

(54) AUTOMATIC FOCUSING SYSTEM AND METHOD THEREOF

(75) Inventor: Zhi-Hui Wen, Foshan (CN)

(73) Assignees: Premier Image Technology(China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 255 days.

(21) Appl. No.: 12/055,582

(22) Filed: Mar. 26, 2008

(65) Prior Publication Data

US 2009/0016709 A1 Jan. 15, 2009

(30) Foreign Application Priority Data

Jul. 13, 2007 (CN) .......................... 2007 1 0201078

(51) Int. Cl.
- *G03B 13/00* (2006.01)
- *H04N 5/232* (2006.01)
- *H04N 9/73* (2006.01)

(52) U.S. Cl. .................... 396/98; 348/353; 348/226.1; 250/201.7

(58) Field of Classification Search ............. 250/201.7; 348/226.1, 353; 396/98, 128
See application file for complete search history.

(56) References Cited

U.S. PATENT DOCUMENTS

| | | | |
|---|---|---|---|
| 6,373,525 B1 * | 4/2002 | Nishiyama | 348/345 |
| 6,989,860 B2 * | 1/2006 | Hofer et al. | 348/226.1 |
| 2003/0090587 A1 * | 5/2003 | Hofer et al. | 348/349 |
| 2004/0016919 A1 * | 1/2004 | Daiku et al. | 257/14 |

* cited by examiner

*Primary Examiner*—W. B. Perkey  
*Assistant Examiner*—Leon W Rhodes  
(74) *Attorney, Agent, or Firm*—Andrew C. Cheng

(57) ABSTRACT

An exemplary automatic focusing system adopted in a camera includes a brightness detecting unit, a recording unit, a correcting unit, and a selecting unit. The brightness detecting unit is configured for detecting a general brightness value of an environment of a subject prior to a focusing operation of the camera and outputting a correction factor associated with the general brightness value. The recording unit is configured for storing a first set of brightness values and the first set of contrast values. The correcting unit stores a preset brightness value and a preset contrast value. The correcting unit is configured for calculating a number of second contrast values according to the correction factor, the first set of brightness values, a preset brightness value, and a preset contrast value. The selecting unit is configured for choosing a maximum contrast value from the number of second contrast values of the subject.

13 Claims, 2 Drawing Sheets

AUTOMATIC FOCUSING SYSTEM AND METHOD THEREOF

TECHNICAL FIELD

The present invention relates to an automatic focusing system and an automatic focusing method thereof, and specifically, to an automatic focusing system and method that can be adopted in a digital camera.

BACKGROUND

In a camera, a typical passive automatic focusing method can be used by evaluating contrast values within a consecutive range near a focus point of a subject located at a center area of a scene. An automatic focusing operation is performed by precisely moving the lens group of the camera within the consecutive range to determine the focus point where the subject has a maximum contrast. During the automatic focusing operation, a number of brightness values of the environment of the subject are also determined.

However, when a digital camera takes pictures of the subject in an environment lit by discharge lamps (e.g., fluorescent lamps which operate directly from AC power supplies), there is a possibility for the digital camera to detect a low brightness value of the environment during the automatic focusing operation due to flickering of the fluorescent lamp at a certain frequency. As a result, the maximum contrast value of the subject may not be reliable found during the automatic focusing operation. Accordingly, the automatic focusing operation is affected.

SUMMARY

In accordance with a present embodiment, an automatic focusing system adopted in a camera including a brightness detecting unit, a recording unit, a correcting unit, and a selecting unit is provided. The brightness detecting unit is configured for detecting a general brightness value of an environment of a subject prior to a focusing operation of the camera and outputting a correction factor associated with the general brightness value. The recording unit is configured for storing a first set of brightness values and the first set of contrast values. The correcting unit stores a preset brightness value and a preset contrast value. The correcting unit is configured for calculating a number of second contrast values according to the correction factor, the first set of brightness values, a preset brightness value, and a preset contrast value. The selecting unit is configured for choosing a maximum contrast value from the number of second contrast values of the subject.

Other novel features and advantages will be drawn from the following detailed description of at least one preferred embodiment, when considered in conjunction with the attached drawings.

BRIEF DESCRIPTION OF THE DRAWINGS

Many aspects of the present automatic focusing system and method can be better understood with reference to the following drawings. The components in the drawings are not necessarily drawn to scale, the emphasis instead being placed upon clearly illustrating the principles of the present automatic focusing system and method. Moreover, in the drawings, like reference numerals designate corresponding parts throughout the several views.

DETAILED DESCRIPTION OF THE PREFERRED EMBODIMENTS

Embodiments of the present automatic focusing system and method will now be described in detail below and with reference to the drawings.

Figure 1:
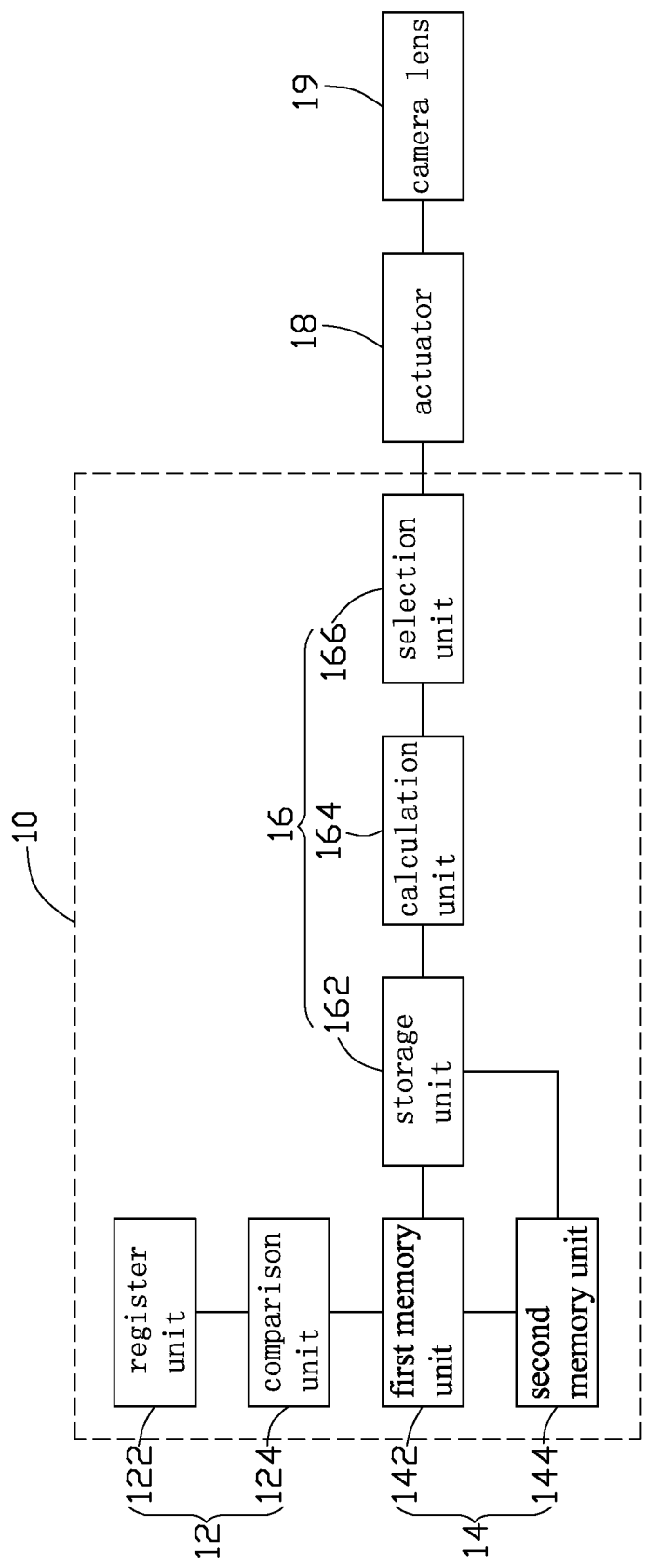
FIG. 1 is a schematic diagram of an automatic focusing system in an embodiment of this invention.

Referring to FIG. 1, an automatic focusing system 10 adopted in a camera in accordance with a present embodiment is shown. The automatic focusing system 10 is configured for controlling an actuator 18 to drive a camera lens 19 for performing an automatic focusing operation. The automatic focusing system 10 includes a brightness detecting unit 12, a recording unit 14, and a correcting unit 16. The brightness detecting unit 12 and the recording unit 14 are electrically connected with the correcting unit 16. The correcting unit 16 is electrically connected with the actuator 18 and the actuator 18 is electrically connected with the camera lens 19.

The brightness detecting unit 12 is configured for detecting a general brightness value of the environment of a subject prior to the focusing operation of the camera. The brightness detecting unit 12 is also configured for determining a first set of brightness values and a first set of contrast values. The first set of brightness values comprises a number of first brightness values of the environment detecting during the focusing operation. The first set of contrast values comprises a number of first contrast values and is determined with respect to the respective first brightness values. The brightness detecting unit 12 includes a register unit 122 and a comparison unit 124. The register unit 122 and the comparison unit 124 are electrically connected to each other. The register unit 122 is configured for detecting the brightness values. The comparison unit 124 is configured for comparing the general brightness values with a preset brightness value stored in the comparison unit 124 for determining and outputting a correction factor.

The recording unit 14 includes a first memory unit 142 and a second memory unit 144. When the automatic focusing operation is performed by the camera in an environment lit by a fluorescent lamp, a number of brightness values are determined by the brightness detecting unit 12 during the automatic focusing operation. In this embodiment, these brightness values are stored as a first set of brightness values. The first memory unit 142 stores the first set of brightness values. A first set of contrast values corresponding to the first set of brightness is also determined with respect to the respective brightness values of the environment during the automatic focusing operation. The second memory unit 144 stores the first set of contrast values corresponding to the first set of brightness values.

The correcting unit 16 includes a storage unit 162, a calculation unit 164, and a selecting unit 166 electrically connected in series. Additionally, the storage unit 162 is also electrically connected to the first memory unit 142 and the second memory unit 144. The storage unit 162 is configured for storing both the first set of brightness values stored in the first memory unit 142 and the first set of contrast values stored in the second memory unit 144. The calculation unit 164 calculates and obtains a second set of contrast values according to a correction formula, which includes the correction factor from the brightness detecting unit 12, the first set of brightness values from the first memory unit 142, and a preset brightness value and a preset contrast value stored in the calculation unit 164. The second set of contrast values is obtained by applying the correction formula to each value in the first set of contrast values. The selecting unit 166 selects a maximum contrast value from the second set of contrast values to determine a best focusing point for automatic focusing. The automatic focusing system 10 further comprises a focusing module (not shown in the drawings) for performing the focusing operation based on the selected maximum contrast value of the subject.

The actuator 18 is electrically connected with the selecting unit 166. According to the maximum contrast value chosen by the selecting unit 166, the actuator 18 drives the camera lens 19 to move for achieving the automatic focusing operation. The actuator 18 can be a component capable of moving the camera lens 19. For example, in this embodiment, the actuator 18 is a stepping motor.

Figure 2:
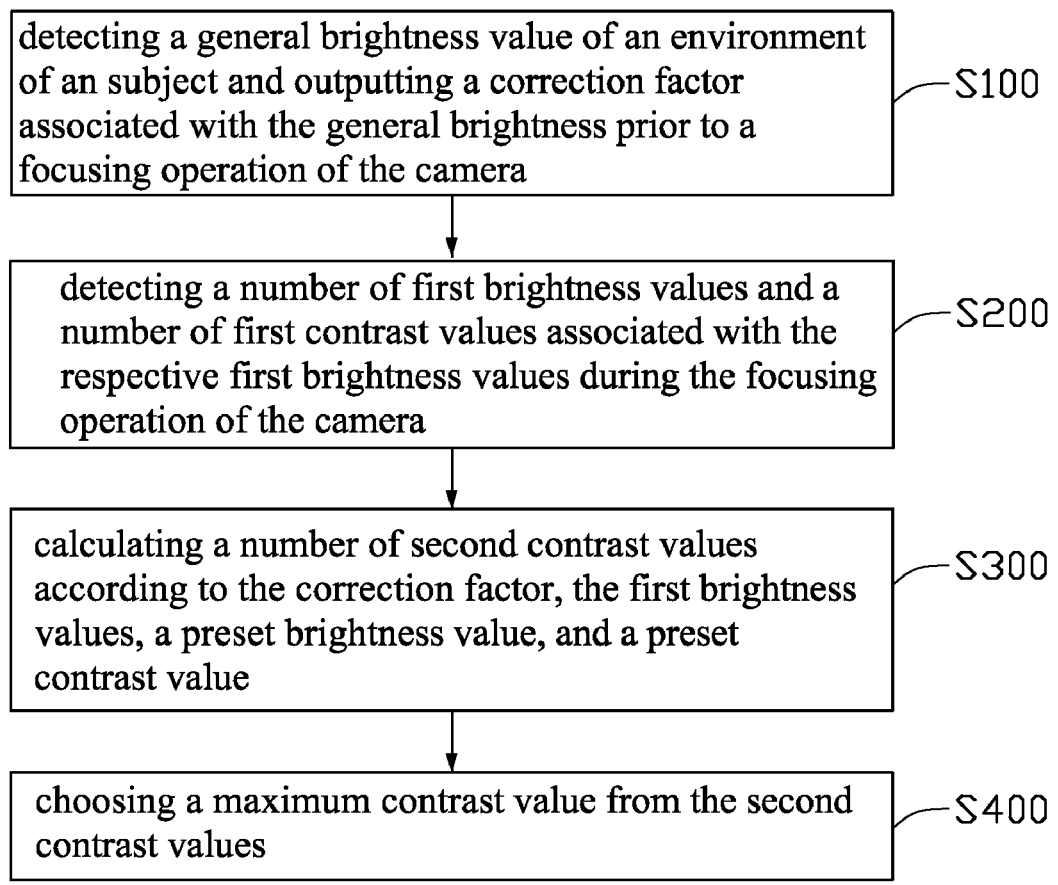
FIG. 2 is a flow chart of an automatic focusing method of the automatic focusing system in FIG. 1.

Referring to FIG. 2, an automatic focusing method provided in the automatic focusing system 10 includes:

S100: detecting a general brightness value of an environment of an subject and outputting a correction factor associated with the general brightness prior to a focusing operation of the camera;

S200: detecting a number of first brightness values and a number of first contrast values associated with the respective first brightness values during the focusing operation of the camera;

S300: calculating a number of second contrast values according to the correction factor, the first brightness values, a preset brightness value, and a preset contrast value; and S400: choosing a maximum contrast value from the second contrast values.

In step S100, the detecting unit 12 determines a general brightness value ($L_0$) of the environment. The detecting unit 12 can be a sensor component like a charged-coupled device (CCD), or a complementary metal oxide semiconductor (CMOS), which is capable of detecting light. A preset brightness value $L_K$ (for example, in this embodiment, $L_K$=100) is stored in the comparison unit 124. The comparison unit 124 compares the general brightness value $L_0$ of the environment with the preset brightness value $L_K$. When $L_0 > L_K$, the comparison unit 124 outputs a correction factor of 1. When $L_0 \leq L_K$, the comparison unit 124 outputs a correction factor of 0.4.

In step S200, the first memory unit 142 stores a first set of brightness values during the automatic focusing operation. These brightness values are stored in the first set of brightness values. The first set of brightness values includes $L_1$, $L_2$, $L_3$, ..., $L_n$, where n is an integer. The second memory unit 144 stores a first set of contrast values corresponding to the first set of brightness values. The first set of contrast values includes $CV_1$, $CV_2$, $CV_3$, ..., $CV_n$, where n is an integer.

In step S300, the storage unit 162 stores both the first set of brightness values stored in the first memory unit 142 and the first set of contrast values stored in the second memory unit 144. The calculation unit 164 stores a preset brightness value ($L_k$) and a preset contrast value ($CV_k$). The calculation unit 164 obtains the correction factor (X) from the comparison unit 124. The calculation unit 164 calculates and outputs a second contrast value ($CV_n'$) according to a correction formula:

$$CV_n' = \frac{CV_k \times [x \times L_n + (100-x) \times L_k]}{100 \times L_k},$$

where $CV_n'$ represents the second contrast value; $L_n$ represents the first brightness value from the first memory unit 142; and $L_k$ is the preset brightness value; $CV_k$ is the preset contrast value; x is the correction factor; k and n are integers. The second set of contrast values are obtained by applying the correction formula to each value in the first set of contrast values. For example, if n=1, then the corrected contrast value $CV_1'$ to the contrast value $CV_1$ is:

$$CV_1' = \frac{CV_k \times [x \times L_1 + (100-x) \times L_k]}{100 \times L_k} \qquad \text{formula (1)}$$

When the general brightness value $L_0$ is greater than the preset brightness value L (i.e. $L_0 > L$), then the correction factor (X) is 1 and $$CV_1' = \frac{CV_k \times (L_1 + 99 \times L_k)}{100 \times L_k}.$$

When the general brightness value $L_0$ is less than or equal to the preset brightness value L (i.e. $L_0 \leq L$), then the correction factor (X) is 0.4 and $$CV_1' = \frac{CV_k \times (0.4 \times L_1 + 99.6 \times L_k)}{100 \times L_k}.$$

Accordingly, the corrected contrast values, $CV_1'$, $CV_2'$, $CV_3'$, ... $CV_n'$, to the first set of contrast values, $CV_1$, $CV_2$, $CV_3$, ... $CV_n$, can be obtained from the formula (1). In step S400, the selecting unit 166 can choose a maximum contrast value from the second set of contrast value for performing the focusing operation based on the selected maximum contrast value of the subject.

The formula (1) is developed according to a relationship between brightness and contrast values by an image sensor having an image capturing speed of 25 frames per second (fps), and 30 fps under a florescent lamp operating at 50 Hz, and a relation between brightness and contrast values of the taken pictures by an image sensor having an image capturing speed of 25 fps and 30 fps under a florescent lamp operating at 60 Hz, and a relationship between brightness and contrast values of the taken pictures by an image sensor having an image capturing speed of 30 fps under a florescent lamp operating at 70 Hz and 80 Hz.

Alternatively, step S100 can be swapped with step S200 to achieve the same purpose.

It will be understood that the above particular embodiment and method are described and shown in the drawings by way of illustration only. The principles and features of the present invention may be employed in various and numerous embodiments thereof without departing from the scope of the invention as claimed. The above-described embodiment illustrates the scope of the invention but do not restrict the scope of the invention.

What is claimed is:

1. An automatic focusing system of a camera comprising:
   a brightness detecting unit configured for detecting a general brightness value of an environment of a subject prior to a focusing operation of the camera and outputting a correction factor associated with the general brightness value; the brightness detecting unit also configured for determining a first set of brightness values and a first set of contrast values; the first set of brightness values comprising a number of first brightness values of the environment detecting during the focusing operation; the first set of contrast values comprising a number of first contrast values which are determined with respect to the respective first brightness values of the environment;

a recording unit configured for storing the first set of brightness values and the first set of contrast values; and a correcting unit configured for calculating a number of second contrast values according to the correction factor, the first set of brightness values, a preset brightness value, and a preset contrast value; and a selecting unit configured for choosing a maximum contrast value from the number of second contrast values of the subject.

2. The automatic focusing system as claimed in claim 1, wherein the recording unit comprises a first memory unit configured for storing the number of first brightness values, and a second memory unit configured for storing the number of first contrast values.

3. The automatic focusing system as claimed in claim 1, further comprising a focusing module for performing the focusing operation based on the selected maximum contrast value of the subject.

4. The automatic focusing system as claimed in claim 1, wherein the brightness detecting unit comprises a register unit configured for detecting the general brightness value of the environment, and a comparison unit configured for comparing the general brightness value with the preset brightness value to determine and output the correction factor.

5. The automatic focusing system as claimed in claim 4, wherein if the general brightness value is greater than the preset brightness value, the correction factor is 1.

6. The automatic focusing system as claimed in claim 4, wherein if the general brightness value is less than or equal to the preset brightness value, the correction factor is 0.4.

7. The automatic focusing system as claimed in claim 1, wherein each of the second contrast values is determined according to the following formula:

$$CV'_n = \frac{CV_k \times [x \times L_n + (100-x) \times L_k]}{100 \times L_k},$$

where $CV_n'$ represents the second contrast value; $L_n$ represents the first brightness value; and $L_k$ is the preset brightness value; $CV_k$ is the preset contrast value; x is the correction factor; k and n are integers.

8. The automatic focusing system as claimed in claim 7, wherein the correcting unit comprises a storage unit configured for storing both the first brightness values and the first contrast values, and a calculation unit configured for storing the formula to obtain the second contrast values.

9. An automatic focusing method of a camera comprising:
   detecting a general brightness value of an environment of an subject and outputting a correction factor associated with the general brightness prior to a focusing operation of the camera;
   detecting a number of first brightness values and a number of first contrast values associated with the respective first brightness values during the focusing operation of the camera;
   calculating a number of second contrast values according to the correction factor, the first brightness values, a preset brightness value, and a preset contrast value; and
   choosing a maximum contrast value from the second contrast values.

10. The automatic focusing method as claimed in claim 9, wherein if the general brightness value is greater than the preset brightness value, the correction factor is 1.

11. The automatic focusing method as claimed in claim 9, wherein if the general brightness value is equal to or less than the preset brightness value, the correction factor is 0.4.

12. The automatic focusing method as claimed in claim 9, further comprising:
   calculating the second contrast values according the formula:

$$CV'_n = \frac{CV_k \times [x \times L_n + (100-x) \times L_k]}{100 \times L_k},$$

where $L_k$ is the preset brightness value; $CV_k$ is the preset contrast value; x is the correction factor; $CV_n'$ is the second contrast value; $L_n$ represents the brightness value; and k and n are integers.

13. The automatic focusing method as claimed in claim 9, further comprising: performing the focusing operation based on the selected maximum contrast value of the subject.

* * * * *